Aug. 24, 1954    E. H. CONROY, JR., ET AL    2,687,344
CYCLIC METHOD FOR CONDENSING SULFUR VAPOR
Filed March 18, 1950
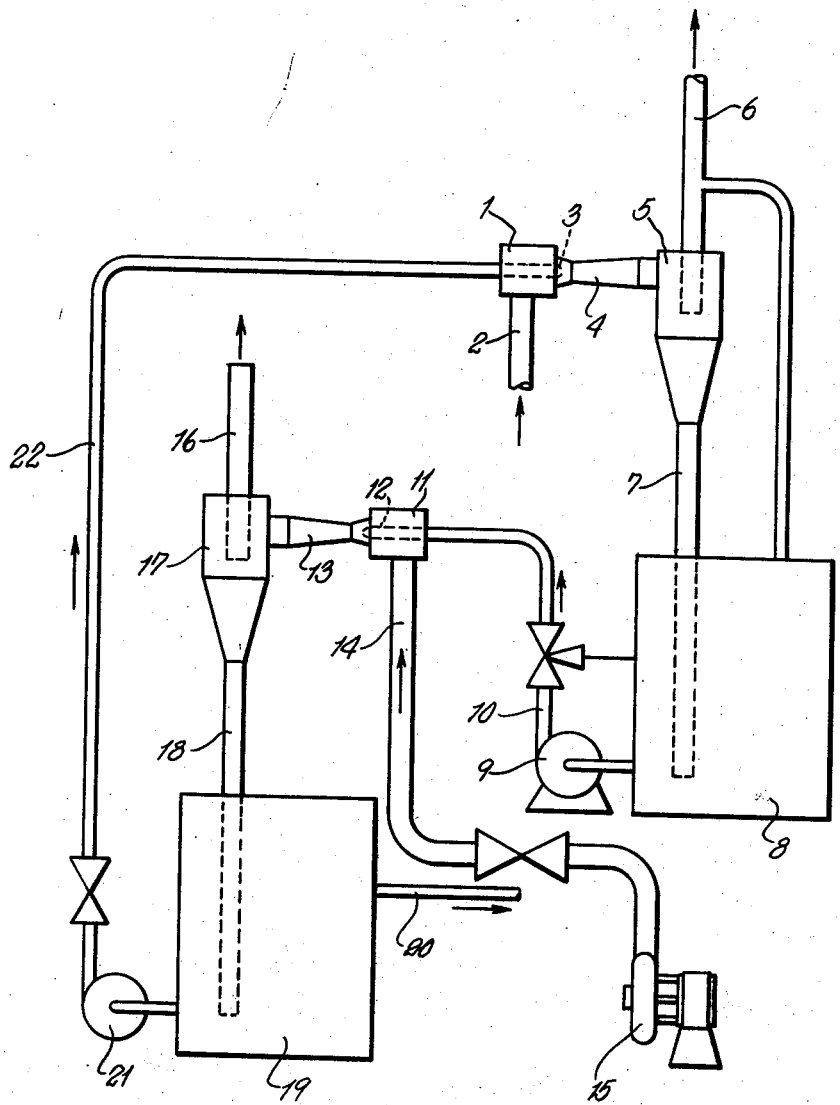
INVENTORS
EDWARD H. CONROY, JR.
HARRY W. HAINES, JR.
BY
Kenyon + Kenyon
ATTORNEYS Patented Aug. 24, 1954

2,687,344

UNITED STATES PATENT OFFICE 2,687,344

CYCLIC METHOD FOR CONDENSING SULFUR VAPOR

Edward H. Conroy, Jr., and Harry W. Haines, Jr., Pittsburgh, Pa., assignors to Texas Gulf Sulphur Company, New York, N. Y., a corporation of Texas Application March 18, 1950, Serial No. 150,474

6 Claims. (Cl. 23—294)

This invention relates to the condensation of sulfur vapor and particularly from non-condensable gases carrying sulfur vapor.

In order to condense sulfur vapor it is necessary to provide a large surface for the heat transfer because of the high resistance to heat transfer between gas and a surface. If the condensation is carried out with surface condensers, it is necessary to provide bulky and complex apparatus which cannot be compressed into a small volume. The pressure drop across such condensers is high and it is necessary to provide a cooling medium such as water. Furthermore, in the use of such condensers there is an area spaced somewhat from the cool surface in which the sulfur is reduced to a fog or mist which cannot be condensed and which is lost unless it is heated again to the temperature of vaporization after which the sulfur of the fog may be captured by condensation.

One of the objects of this invention is to provide a method and apparatus for condensing sulfur vapors in which the disadvantages above mentioned are avoided.

Another object is to provide such a method and apparatus in which a large surface is supplied for heat transfer in equipment which is of reduced size and complexity and in which the pressure drop is low.

Another object of the invention is to provide a method and apparatus in which the loss of sulfur as a fog or mist is substantially eliminated.

Another object is to provide such a method and apparatus in which cooling water is not necessary.

Another object of the invention is to provide a simple cyclic method for removing or condensing sulfur vapor from a stream of gas.

In carrying out the invention, a jet condenser is employed. Liquid sulfur is sprayed into the stream of gas containing the sulfur vapor. The liquid sulfur which is sprayed is maintained at a temperature substantially equal to the temperature of liquefaction of sulfur. The sprayed sulfur cools the sulfur vapor and removes the heat of vaporization therefrom. In carrying out the invention the temperature of the liquid sulfur and the condensed sulfur which combines with it, is maintained below the temperature at which sulfur becomes viscous by controlling the amount and temperature of the liquid sulfur sprayed. The sulfur is separated from the stream by a cyclone or centrifugal separator.

In the preferred form of the invention, the combined sprayed sulfur and condensed sulfur is cooled to a temperature approaching the liquefaction temperature of sulfur. This is done by spraying the sulfur in a stream of cold air. The cooled sulfur is then separated by a cycline or centrifugal separator and an amount of sulfur substantially equal to the condensed sulfur is drawn off and sent to storage or to a point of use. The remainder of the sulfur is then pumped to the first jet condenser to complete the cyclic operation.

The temperature at which sulfur liquefies is approximately 114.5° C. The temperature at which it becomes viscous is approximately 160° C. It is preferred to cool the liquid sulfur to approximately 120° C. and to keep the temperature of the combined liquid sulfur and condensed sulfur below 150° C., thus allowing adequate margins for variations in commercial practice.

In the drawing there is shown conventional, suitable apparatus for carrying out the invention. An ejector, or jet condenser, 1, having an inlet 2 for sulfur vapor, a nozzle 3 for liquid sulfur and a venturi 4 are employed for the condensation of the sulfur vapor. The sulfur vapor enters at 2 at a temperature of about 300° C. The liquid sulfur is sprayed from the jet 3 at a temperature substantially equal to the temperature of liquefaction of sulfur, namely, about 120° C. It is sprayed in finely-divided form and provides a large surface and the sulfur vapors are condensed by the absorption of the heat of vaporization by the sprayed liquid sulfur, increasing the size of the drops by the added condensed sulfur. The combined sprayed sulfur and condensed sulfur are kept at a temperature below that at which sulfur becomes viscous, preferably about 150° C. This permits the separation of the sulfur in the cyclone separator indicated at 5. The non-condensable gases pass out through the pipe 6 and the collected sulfur passes down through a pipe 7 to a tank 8.

The temperature of the combined sprayed sulfur and condensed sulfur is kept at the temperature above set forth by controlling the temperature of the sprayed sulfur and by controlling the quantity sprayed. If, for instance, the gas bearing the sulfur vapor is at 300° C. and 140 cubic feet of this gas contains one pound of sulfur in order to condense this sulfur vapor it is necessary to spray approximately 145 pounds of sulfur at 120° C. This, of course, will vary with the amount of sulfur vapor and with the temperature of the liquid sulfur to be sprayed.

The liquid sulfur from tank 8 is pumped by a pump 9 through conduit 10 to an ejector or jet condenser 11, which has a sulfur nozzle 12 and venturi 13 and an inlet 14 for cool air which is supplied by a fan 15. It is preferred to cool this sulfur down to about 120° C. The exhaust air passes out through a pipe 16 and a cyclone or centrifugal separator 17 separates the sulfur which passes through a pipe 18 to a tank 19. A conduit 20 is provided to draw off sulfur equal in amount to the sulfur condensed in the operation of the device. A pump 21 supplies the sulfur under pressure through a pipe 22 to the ejector or jet condenser 1.

In practicing this invention it is thus possible to provide the large surface necessary for heat transfer in a small volume. The apparatus is not complex and a very low pressure drop is involved in carrying out the operation. There is practically no loss of the sulfur as fog or mist, and it is not necessary to make use of cooling water as would be the case in ordinary surface condensers.

The preferred form of the invention has been described. There is no intention to be limited, however, to the specific form described. The invention is defined in the appended claims.

We claim:

1. The cyclic method of condensing sulfur vapor from a stream of gas containing the same comprising removing the heat of vaporization of the sulfur vapor by spraying liquid sulfur in a finely-divided state into said stream of gas containing sulfur vapor and maintaining the temperature of the sprayed sulfur and the sulfur condensed thereby at a temperature at which sulfur is liquid, but below the temperature substantially above the melting point of sulfur at which liquid sulfur becomes viscous by controlling the amount of liquid sulfur sprayed and by maintaining the temperature of the liquid sulfur as it is sprayed at a temperature below the temperature of the combined sprayed liquid sulfur and condensed sulfur and separating the sprayed liquid sulfur and condensed sulfur and withdrawing from the removed sprayed and condensed sulfur an amount substantially equivalent to the amount of sulfur condensed by the sprayed sulfur and using the balance of said sulfur for further spraying and cooling the sulfur to be sprayed by spraying it in finely-divided form into a stream of cooler gas and removing it from said stream of cooler gas as a liquid to be sprayed.

2. The cyclic method of condensing sulfur vapor from a stream of gas containing the same comprising removing the heat of vaporization of the sulfur vapor by spraying liquid sulfur in a finely-divided state into said stream of gas containing sulfur vapor at a temperature substantially the temperature of liquefaction of sulfur and maintaining the temperature of the sprayed sulfur and the sulfur condensed thereby at a temperature at which sulfur is liquid, but below the temperature substantially above the melting point of sulfur at which liquid sulfur becomes viscous by controlling the amount of liquid sulfur sprayed and separating the sprayed liquid sulfur and condensed sulfur and withdrawing from the removed sprayed and condensed sulfur an amount substantially equivalent to the amount of sulfur condensed by the sprayed sulfur and using the balance of said sulfur for further spraying and cooling the sulfur to be sprayed by spraying it in finely-divided form into a stream of cooler gas and removing it from said stream of cooler gas as a liquid to be sprayed.

3. The cyclic method of condensing sulfur vapor from a stream of gas containing the same comprising removing the heat of vaporization of the sulfur vapor by spraying liquid sulfur in a finely-divided state into said stream of gas containing sulfur vapor at a temperature of about 120° C. and maintaining the temperature of the sprayed sulfur and the sulfur condensed thereby at a temperature below 150° C. by controlling the amount of liquid sulfur sprayed and separating the sprayed liquid sulfur and condensed sulfur and withdrawing from the removed sprayed and condensed sulfur an amount substantially equivalent to the amount of sulfur condensed by the sprayed sulfur and using the balance of said sulfur for further spraying and cooling the sulfur to be sprayed to about 120° C. by spraying it in finely-divided form into a stream of cooler gas and removing it from said stream of cooler gas as a liquid to be sprayed.

4. The method of condensing sulfur vapor from a stream of gas containing the same comprising passing said stream of gas through a Venturi passage and simultaneously removing the heat of vaporization of the sulfur vapor by spraying liquid sulfur in the finely-divided state into said stream sulfur in its direction of flow and maintaining the temperature of the sprayed sulfur and the sulfur condensed thereby at a temperature at which sulfur is liquid, but below the temperature substantially above the melting point of sulfur at which liquid sulfur becomes viscous by controlling the amount of liquid sulfur sprayed and by maintaining the temperature of the liquid sulfur as it is sprayed at a temperature below the temperature of the combined sprayed liquid sulfur and condensed sulfur and separating the sprayed liquid sulfur and condensed sulfur from said stream and withdrawing from the removed sprayed and condensed sulfur an amount substantially equivalent to the amount of sulfur condensed by the sprayed sulfur and using the balance of said sulfur for further spraying and cooling the sulfur to be sprayed by spraying it in finely-divided form into a stream of cooler gas simultaneously when passing said gas through a venturi and in the direction of flow of said stream of gas and removing it from said stream of cooler gas as a liquid to be sprayed.

5. The method of condensing sulfur vapor from a stream of gas containing the same comprising passing said stream of gas through a Venturi passage and simultaneously removing the heat of vaporization of the sulfur vapor by spraying liquid sulfur in the finely-divided state into said stream in its direction of flow directly in advance of said Venturi passage whereby said finely-divided liquid sulfur and said gas are compacted and intimately mixed while passing through said Venturi passage and maintaining the temperature of the sprayed sulfur and the sulfur condensed thereby at a temperature at which sulfur is liquid, but below the temperature substantially above the melting point of sulfur at which liquid sulfur becomes viscous by controlling the amount of liquid sulfur sprayed and by maintaining the temperature of the liquid sulfur as it is sprayed at a temperature below the temperature of the combined sprayed liquid sulfur and condensed sulfur and separating the sprayed liquid sulfur and condensed sulfur from said stream.

6. The method of condensing sulfur vapor from a stream of gas containing the same comprising passing said stream of gas through a Venturi passage and simultaneously removing the heat of vaporization of the sulfur vapor to reduce the temperature of said vapor to a temperature below that at which sulfur vapor condenses by spraying cooler liquid sulfur in the finely-divided state into said stream in its direction of flow directly in advance of said Venturi passage whereby said finely-divided liquid sulfur and said gas are compacted and intimately mixed when passing through said Venturi passage and said sulfur vapor is condensed.

References Cited in the file of this patent

UNITED STATES PATENTS

| Number | Name | Date |
|---|---|---|
| 2,127,571 | Pardee | Aug. 23, 1938 |
| 2,386,390 | Fernlius | Oct. 9, 1945 |
| 2,497,095 | Nevins et al. | Feb. 14, 1950 |